R. F. JUDSON.
Draft-Equalizing Whiffletree.

No. 76,466.   Patented April 7, 1868.

Witnesses
J. S. Knight
Amos D. Allen

Inventor
R. F. Judson

United States Patent Office.

ROBERT F. JUDSON, OF KALAMAZOO, MICHIGAN.

Letters Patent No. 76,466, dated April 7, 1868.

IMPROVEMENT IN DRAUGHT-EQUALIZER FOR DOUBLE-TREE.

*The Schedule referred to in these Letters Patent and making part of the same.*

TO ALL WHOM IT MAY CONCERN:

Be it known that I, ROBERT F. JUDSON, of Kalamazoo, in the county of Kalamazoo, and State of Michigan, have invented a new and useful Draught-Equalizing Double Whiffle-Tree; and I do hereby declare that the following is a full, clear, and exact description thereof, reference being had to the accompanying drawings, making part of this specification.

Figure 1:
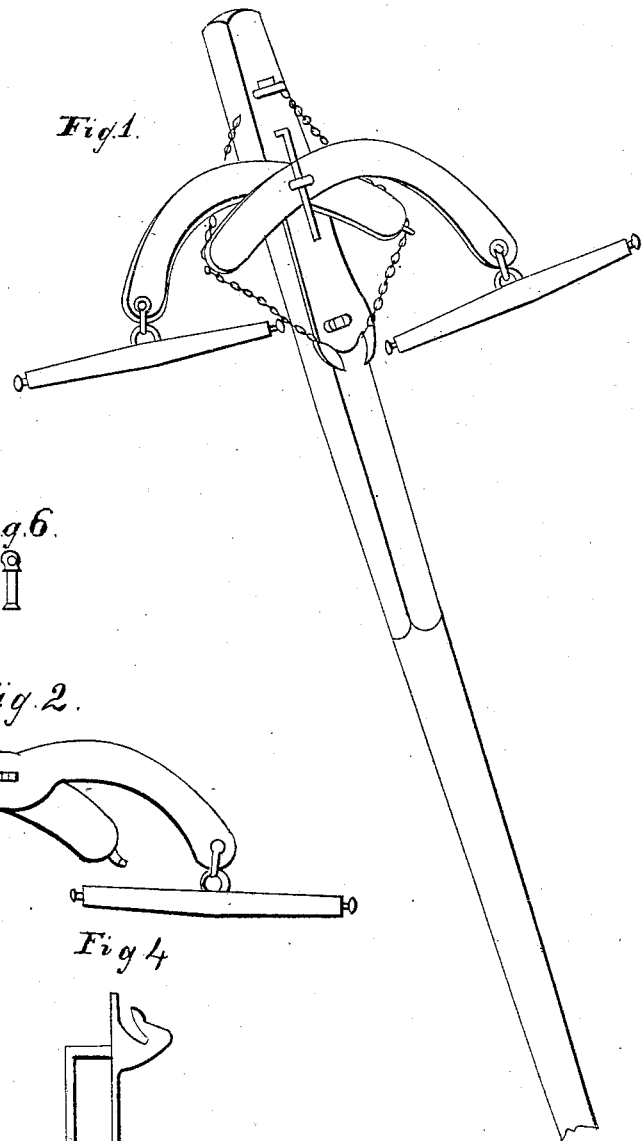

Figure 1 is a perspective view.

Figure 6:
Figure 2:
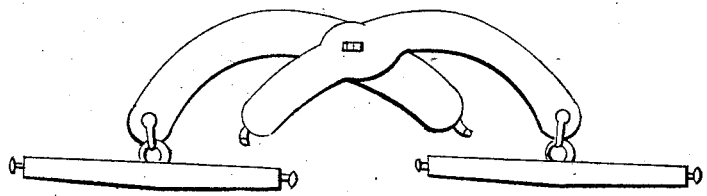

Figure 2, longitudinal view of curved levers, with whiffle-tree attached; levers united by the bolt shown in fig. 6.

Figure 3:
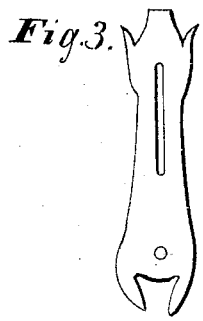

Figure 3, longitudinal view of draught-iron, or improved clevis.

Figure 4:
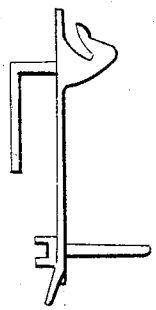

Figure 4, side view of improved clevis.

Figure 5, king-bolt.

Figure 6, bolt with eye at the top for connecting curved levers.

The nature of my invention consists substantially in attaching to the pole of a buggy, wagon, sleigh, reaper, or mower, by means of a king-bolt at the forward end, and a staple at the rear end, a clevis or draught-iron, having a hook on each side, and near the forward end, also a hook on each side and near the rear end, which passes under the staple. To these hooks are attached two stay-chains, which stay-chains are attached by hooks to the ends of the short arms of two curved or bent levers, crossing each other, and united at the point of crossing by a bolt with an eye at the top. At the rear of the bent levers is a staple, attached to the clevis, bent at right angles, and passing forward through the eye of the bolt uniting the bent levers, for the purpose of steadying the same, also to prevent the whiffle-trees from scraping the wheels. To the long arms of the bent levers are attached ordinary small whiffle-trees. The stay-chains may be used for all heavy-draught purposes. For light-draught buggies or sleighs, wood or leather braces may be used in the place of the stay-chains, being united by joints, buttons, or hooks, with the ends of the short arms of the bent levers, and the forward and rear ends of the iron clevis.

The invention has for its object the preventing of a quicker or stronger horse from obtaining an advantage over a slower or weaker one; also to cause the stronger horse to aid the weaker, in proportion as his strength is greater, and to prevent the whiffle-tree from scraping the wagon-wheels.

To enable others skilled in the art to make and use my invention, I will describe its construction and operation.

Figure 5:

The bent levers, fig. 2, with whiffle-trees attached to the end of each long arm, and hooks to the end of each short arm, are united, as they cross each other, by the bolt, fig. 6, headed on the under side of the levers, and having an eye at the top. The levers are attached to the iron clevis, fig. 3, by means of a staple, near the rear end of the clevis, fig. 4, bent forward at right angles, and passing through the eye of the bolt uniting the levers. This staple answers the purpose of steadying the levers in their places, and also prevents their slipping back so as to scrape the wagon-wheels. To the hooks on the ends of the short arms of the bent levers, are attached stay-chains, as seen in fig. 1, by means of passing a link of each chain over each hook, which stay-chains are attached to the iron clevis by hooks on each side, and near the forward and rear ends of the same, (fig. 1.) The stay-chains are attached to the short arms of the bent levers, so that the portion of each chain, forward of the levers is shorter than that back of the same. The stay-chains may be shortened or lengthened at pleasure. The iron clevis is attached to the pole by means of the king-bolt, fig. 5, near the forward end, and a staple, under which the rear end passes, fig. 1.

With the stay-chains hooked so that the bolt uniting the bent levers cannot be crowded forward of the line of the hooks, at their short ends, the animal, pulling on the whiffle-tree, at one end of the levers, at the same time, by means of said bolt, crowds forward the opposite lever, thus rendering it impossible for him to secure an advantage over his mate. For the same reason, the instant he pulls more than the opposite animal, he aids him in that proportion. When the animals slacken the draught, the staple, passing through the eye of the bolt uniting the levers, prevents the whiffle-tree scraping the wagon-wheels.

Having described my invention, what I claim as new, and desire to secure by Letters Patent, is—

The combination of the stay-chains, or wood or leather braces, the curved levers, crossing each other, and united by a bolt forming a joint, the iron clevis, with hooks on each side, and near each end of the same, the staple in the clevis, the king-bolt, the staple attaching rear end of clevis to the wagon-pole, the small whiffle-tree, with the wagon-pole, for the purposes set forth and described.

R. F. JUDSON.

Witnesses:
AMOS D. ARLIN,
J. I. KNIGHT.